(12) United States Patent
Syngaevskiy et al.

(10) Patent No.: US 9,590,548 B2
(45) Date of Patent: Mar. 7, 2017

(54) METHOD AND APPARATUS FOR REGULATING AN OUTPUT VOLTAGE OF AN ALTERNATOR

(71) Applicants: Vasily Alekseyevich Syngaevskiy, Moscow (RU); Denis Sergeevich Shuvalov, Zelenograd (RU); Kirill Alexandrovich Treshchanovskiy, Moscow (RU)

(72) Inventors: Vasily Alekseyevich Syngaevskiy, Moscow (RU); Denis Sergeevich Shuvalov, Zelenograd (RU); Kirill Alexandrovich Treshchanovskiy, Moscow (RU)

(73) Assignee: NXP USA, Inc., Austin, TX (US)

( * ) Notice: Subject to any disclaimer, the term of this patent is extended or adjusted under 35 U.S.C. 154(b) by 32 days.

(21) Appl. No.: 14/669,802

(22) Filed: Mar. 26, 2015

(65) Prior Publication Data
US 2016/0094171 A1    Mar. 31, 2016

(30) Foreign Application Priority Data
Sep. 25, 2014    (RU) ................. 2014138610

(51) Int. Cl.
*H02P 9/02*    (2006.01)
*H02P 9/30*    (2006.01)
*H02P 9/48*    (2006.01)

(52) U.S. Cl.
CPC ................. *H02P 9/02* (2013.01); *H02P 9/30* (2013.01); *H02P 9/48* (2013.01)

(58) Field of Classification Search
CPC ................. H02P 9/02; H02P 9/30; H02P 9/48
See application file for complete search history.

(56) References Cited

U.S. PATENT DOCUMENTS

| | | | |
|---|---|---|---|
| 6,081,103 A * | 6/2000 | Pierret | H02J 7/245 318/254.2 |
| 6,118,186 A * | 9/2000 | Scott | H02P 9/04 290/1 A |
| 6,486,638 B1 * | 11/2002 | Sumimoto | H02P 9/305 322/28 |
| 6,985,821 B2 * | 1/2006 | Kawabata | G01R 19/16547 322/28 |

(Continued)

*Primary Examiner* — Viet Nguyen
(74) *Attorney, Agent, or Firm* — Charlene R. Jacobsen

(57) ABSTRACT

A method of regulating an output voltage of an alternator. The method comprises measuring first and second external contacts of the alternator regulator module operably coupled to first and second output contacts of the alternator respectively during an ON state of an excitation cycle for the alternator, measuring a second voltage across the first and second external contacts of the alternator regulator module during an OFF state of an excitation cycle for the alternator, deriving an average voltage value of the first and second voltage measurements, and deriving an offset value based at least partly on the derived average voltage value.

The method further comprises measuring an instantaneous voltage across the first and second external contacts of the alternator regulator module, and configuring a control signal for regulating the output voltage of the alternator based at least partly on the instantaneous voltage measurement and the derived offset value.

20 Claims, 5 Drawing Sheets

(56) References Cited

U.S. PATENT DOCUMENTS

| | | | |
|---|---|---|---|
| 2002/0021111 A1* | 2/2002 | Ogino | H02J 7/166 322/28 |
| 2008/0122408 A1* | 5/2008 | Keiter | F02D 29/06 322/28 |
| 2008/0231243 A1 | 9/2008 | Zhong et al. | |
| 2009/0167256 A1* | 7/2009 | Maddali | H02P 9/10 322/25 |
| 2009/0218991 A1* | 9/2009 | Eaton | H02P 9/305 322/28 |
| 2010/0201329 A1* | 8/2010 | Ahn | H02P 9/305 322/28 |
| 2012/0153904 A1* | 6/2012 | Albsmeier | H02P 9/04 322/28 |
| 2013/0113442 A1* | 5/2013 | Kawamura | H02P 9/10 322/46 |

\* cited by examiner

METHOD AND APPARATUS FOR REGULATING AN OUTPUT VOLTAGE OF AN ALTERNATOR

CROSS REFERENCE TO RELATED APPLICATION(S)

The present application claims priority to Russian Patent Application No. RU 2014138610, entitled "METHOD AND APPARATUS FOR REGULATING AN OUTPUT VOLTAGE OF AN ALTERNATOR," filed on Sep. 25, 2014, the entirety of which is herein incorporated by reference.

FIELD OF THE INVENTION

This invention relates to a method of regulating an output voltage of an alternator and an alternator regulator module.

BACKGROUND OF THE INVENTION

FIG. 1 illustrates a simplified circuit diagram of an alternator regulator circuit 100 for regulating an output voltage of an alternator 110 within, say, an automotive application. A problem that such alternator regulator circuits face is that alternator manufacturers want the regulator circuit 100 to regulate the voltage at the contacts (screws) of the alternator 110, indicated generally at 112, 114, and regulation performances for the next generation of alternator regulators are required to achieve a voltage regulation accuracy of +/−100 mV. However, the integrated circuit (IC) device 105 comprising the regulator circuit 100 can only see and regulate the voltage at its pads, indicated generally at 102, 104. Due to parasitic resistances between the contacts 112, 114 of the alternator 110 and the pads 102, 104 of the regulator IC device 105 (e.g. within bonding wires, package leads, brush holder leads, etc.) and the significant excitation currents generated, the voltages at the pads 102, 104 of the regulator IC device 105 can differ from the voltages at the contacts 112, 114 of the alternator 110. Such parasitic resistances cannot easily be determined, making it difficult to regulate the voltage at the contacts 112, 114 of the alternator 110 based on measurements of the voltage at the pads 102, 104 of the regulator IC device 105, and in particular make it difficult to achieve the required voltage regulation accuracy of +/−100 mV.

SUMMARY OF THE INVENTION

The present invention provides method of regulating an output voltage of an alternator and an alternator regulator module for regulating an output voltage of an alternator as described in the accompanying claims.

Specific embodiments of the invention are set forth in the dependent claims.

These and other aspects of the invention will be apparent from and elucidated with reference to the embodiments described hereinafter.

BRIEF DESCRIPTION OF THE DRAWINGS

Further details, aspects and embodiments of the invention will be described, by way of example only, with reference to the drawings. In the drawings, like reference numbers are used to identify like or functionally similar elements. Elements in the figures are illustrated for simplicity and clarity and have not necessarily been drawn to scale.

DETAILED DESCRIPTION OF THE PREFERRED EMBODIMENTS

The present invention will now be described with reference to the accompanying drawings in which there are illustrated examples of a method and apparatus for regulating an output voltage of an alternator. However, it will be appreciated that the present invention is not limited to the specific examples herein described and illustrated in the accompanying drawings.

Furthermore, because the illustrated embodiments of the present invention may for the most part, be implemented using electronic components and circuits known to those skilled in the art, details will not be explained in any greater extent than that considered necessary as illustrated below, for the understanding and appreciation of the underlying concepts of the present invention and in order not to obfuscate or distract from the teachings of the present invention.

Figure 1:
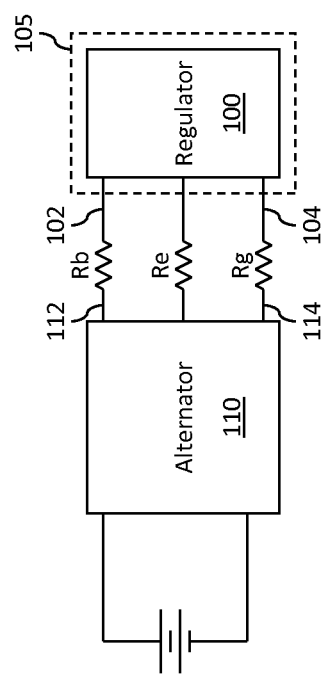
FIG. 1 illustrates a simplified circuit diagram of an alternator regulator circuit for regulating an output voltage of an alternator.
Figure 2:
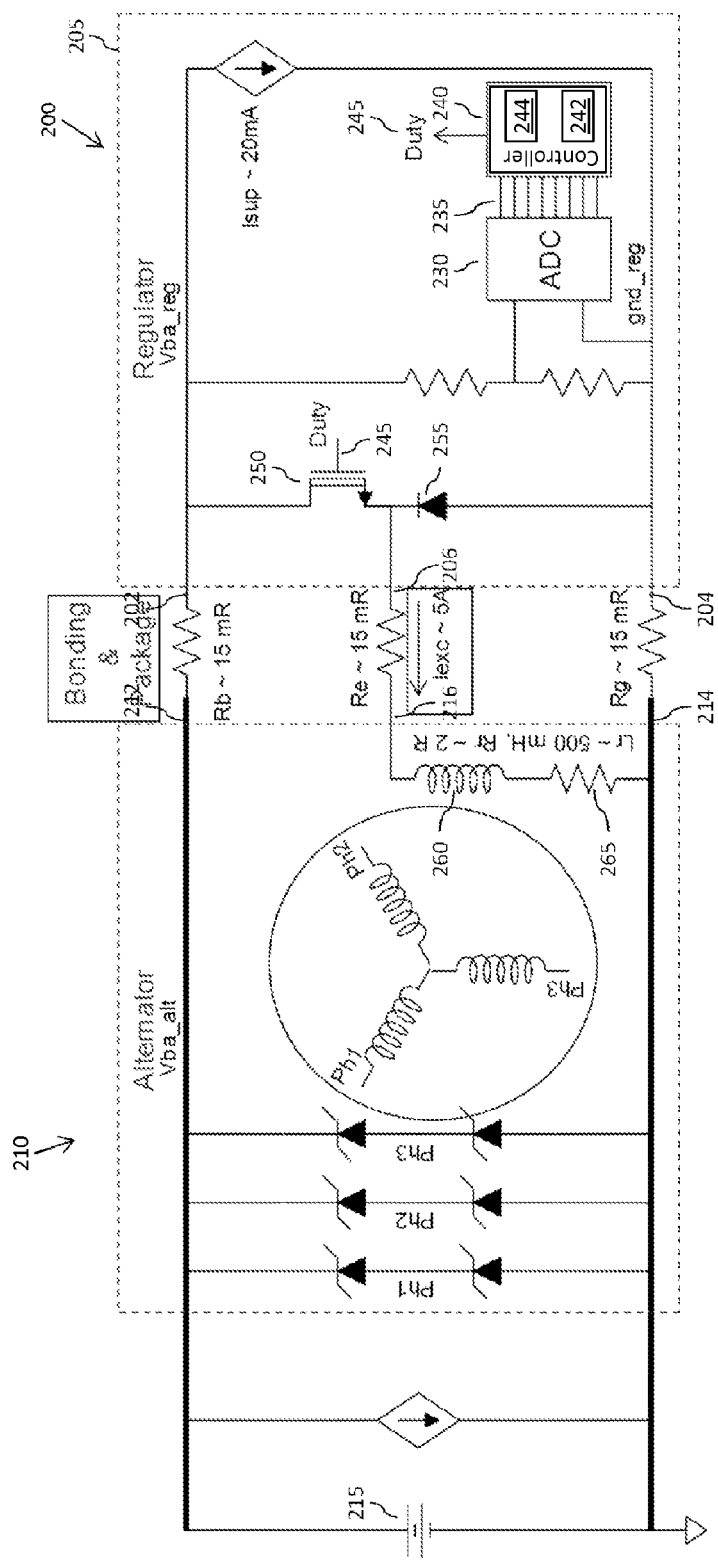
FIGS. 2 to 4 illustrate simplified schematic diagrams of an example of an alternator regulator module for regulating an output voltage of an alternator.

Referring now to FIG. 2, there is illustrated a simplified schematic diagram of an example of an alternator regulator module 200 for regulating an output voltage of an alternator 210 within, say, an automotive application. The alternator regulator module 200 in the illustrated example is implemented within an integrated circuit device comprising one or more semiconductor die(s) within an integrated circuit package 205. External contact pads of the integrated circuit package 205 comprising the alternator regulator module 200, indicated generally at 202, 204, 206, are operably coupled to contacts of the alternator 210, indicated generally at 212, 214, 216. Parasitic resistances between the contacts 212, 214, 216 of the alternator 10 and the pads 202, 204, 206 of the regulator IC device 205 within, for example, within bonding wires, package leads, brush holder leads, etc. are represented generally by resistances Rb 222, Rg 224 and Re 226.

In automotive applications, the supply contacts 212, 214 of the alternator 210 are arranged to be operably coupled across a vehicle battery 215. The alternator regulator module 200 is arranged to regulate the voltage at the supply contacts 212, 214 of the alternator 210. By measuring a voltage across the pads 202, 204 of the regulator IC device 205 and modulating an excitation current provided to the excitation contact 216 of the alternator 210. In the illustrated example, the alternator regulator module 200 comprises an analogue to digital converter (ADC) component 230 arranged to receive an analogue voltage signal representative of the voltage across the pads 202, 204 of the regulator IC device 205, and to output a digital signal 235 comprising an indication of the voltage across the pads 202, 204. The digital signal 235 output by the ADC component 230 is provided to a digital control component, indicated generally at 240. The digital control component 240 is arranged to generate a control signal 245 based at least partly on the received digital control signal 235.

The control signal 245 is provided to a gate of a control switch 250 to control the control switch 250 to selectively couple the excitation pad 206 of the regulator IC device 205 to the positive supply pad 202 of the regulator IC device 205. In particular, in the illustrated example the digital control component 240 is arranged to generate a pulse width modulated (PWM) control signal 245 such that the control switch 250 is controlled to alternate between an OFF state in which the control switch 250 is arranged to isolate the excitation pad 206 of the regulator IC device 205 from the positive supply pad 202 of the regulator IC device 205 and an ON state in which the control switch 250 is arranged to couple the excitation pad 206 of the regulator IC device 205 to the positive supply pad 202 of the regulator IC device 205. The excitation pad 206 of the regulator IC device 205 is further operably coupled to the ground pad 204 of the regulator IC device 205 via a diode component 255 orientated to prevent current flow in the direction from the excitation pad 206 of the regulator IC device 205 to the ground pad 204 of the regulator IC device 205, whilst allowing current flow in the direction from the ground pad 204 of the regulator IC device 205 to the excitation pad 206 of the regulator IC device 205.

The excitation current output from the excitation pad 206 of the regulator IC device 205 is provided to the excitation contact 216 of the alternator 210, and is used to 'excite' wound field coils within the alternator in order to generate an electromagnetic field. As illustrated in FIG. 2, the wound field coils may be represented generally by a resistance Rr 260 and an inductance Lr 265 operably coupled in series between the excitation contact 216 or the alternator 210 and the ground contact 214 of the alternator 210.

In operation, when the control switch 250 is in an on state, the excitation pad 206 of the regulator IC device 205 is operably coupled to the positive supply pad 202 of the regulator IC device, which in turn is operably coupled to the positive supply contact 212 of the alternator 210. As such, an excitation current is driven by the voltage at the positive supply contact 212 of the alternator 210 through the control switch 250 and into the wound field coils of the alternator via the excitation contact 216 thereof. Conversely, when the control switch 250 is in an off state, the excitation pad 206 of the regulator IC device 205 is isolated from the positive supply pad 202 of the regulator IC device. The inductance 265 within the wound field coils continues to pull an excitation current from the excitation pad 206 of the regulator IC device 205, which is supplied from the ground contact 214 of the alternator 210 via the ground pad 204 of the regulator IC device 205 and the diode component 255.

As is well known in the art, by varying the magnitude of the excitation current provided to the wound field coils, the strength of the magnetic field generated thereby may be varied, and thus the voltage generated by the alternator 210 across its supply contacts 212, 214. The magnitude of the excitation current is controllable by way of controlling the duty cycle of the control signal 245. Accordingly, by configuring the duty cycle of the control signal 245 in accordance with the digital signal 235 output by the ADC component 230, the digital control component 240 is able to regulate the voltage output by the alternator 210 based on the voltage measured across the supply pads 202, 204 of the regulator IC device 205.

However, as described in the background of the invention, the alternator regulator module 200 can only see and regulate the voltage at the respective pads 202, 204 of the regulator IC device 205. Due to the parasitic resistances 222, 224 between the contacts 212, 214 of the alternator 210 and the pads 202, 204 of the regulator IC device 205, and the significant excitation currents generated, the voltages at the pads 202, 204 of the regulator IC device 205 can differ significantly from the voltages at the contacts 212, 214 of the alternator 210.

Such parasitic resistances 222, 224, 226 cannot easily be determined, making it difficult to regulate the voltage at the contacts 212, 214 of the alternator 210 based on measurements of the voltage at the pads 202, 204 of the regulator IC device 205. The parasitic resistances 222, 224, 226 are typically small, for example in the region of 10 to 15 mΩ each (at high temperatures where the resistance of bond wires is largest). However, the excitation currents provided by the alternator regulator module 200 can be of the order of 5 to 8 Amps. The IR drop that such a current causes across a parasitic resistance can thus be up to 15 mΩ×8 A=120 mV. This is greater than an allowed regulation tolerance of 100 mV. As such, in order for the alternator regulator module 200 to regulate the voltage across the supply contacts 212, 214 of the alternator 210 with sufficient accuracy based on voltage measurements across the pads 202, 204 of the regulator IC device 205, the IR drop across the parasitic resistances must be compensated for.

The difference dV between the voltage across the supply contacts 212, 214 of the alternator 210 and the voltage across the pads 202, 204 of the regulator IC device 205 may be expressed as:

$$dV = Vba\_alt - (Vba\_reg - Vgnd\_reg) \qquad \text{[Equation 1]}$$

where Vba_alt is the voltage across the alternator (e.g. the voltage at a positive supply contact 212 of the alternator 210 where the ground supply contact 214 of the alternator 210 is taken as absolute ground), Vba_reg is the voltage at the positive pad 202 of the regulator IC device 205 and Vgnd_reg is the voltage at the ground pad 204 of the regulator IC device 205.

Figure 3:
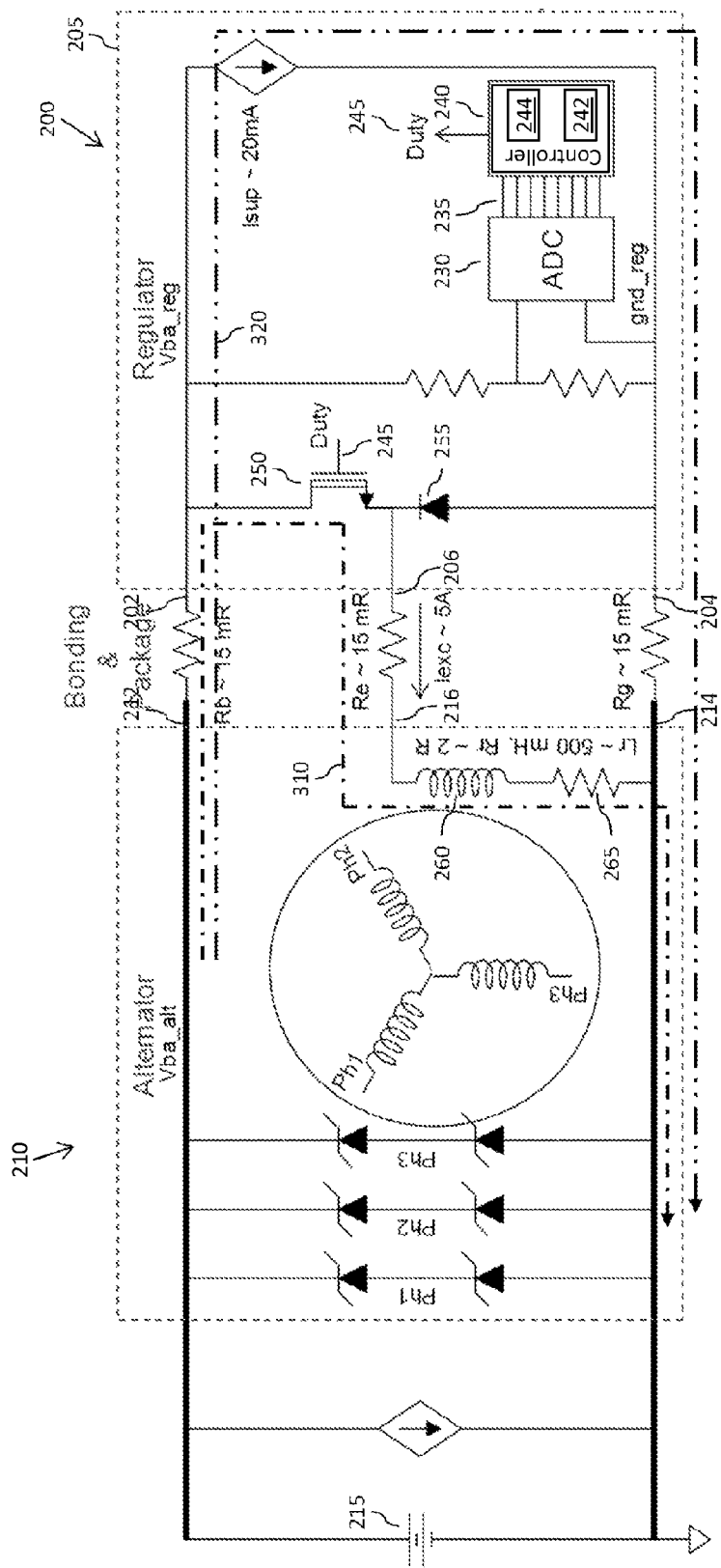

Referring now to FIG. 3, there is illustrated a simplified schematic diagram of the alternator regulator module 200 of FIG. 2 when operating in a first, ON mode in which the control switch 250 is controlled by the control signal 245 to be in an ON state. The excitation current Iexc in such an ON mode of operation is indicated generally by a first broken arrow 310 in FIG. 3. The difference dVon between the voltage across the supply contacts 212, 214 of the alternator 210 and the voltage across the pads 202, 204 of the regulator IC device 205 during such an ON mode of operation may be expressed in terms of the IR drops across the parasitic resistance Rb between the positive source contact 212 of the alternator 210 and the positive source pad 202 of the regulator IC device 205 and the parasitic resistance Rg between the ground source contact 214 of the alternator 210 and the ground pad 204 of the regulator IC device 205 as:

$$dVon = Rb^*(Iexc + Isup) + Rg^*Isup \qquad \text{[Equation 2]}$$

$$= Iexc^*Rb + Isup^*(Rb + Rg) \qquad \text{[Equation 3]}$$

where Iexc is the excitation current 310 and Isup represents a supply current drawn by the alternator regulator module 200, and indicated generally by a second broken arrow 320 in FIG. 3. Assuming parasitic resistances of 15 mΩ, an excitation current 310 of 8 A and a typical supply current 320 of, say, 20 mA: dVon=15 m*(8 A+20 mA)+15 m*20 m~120 m+300 u~120 mV. From this it is apparent that the difference dVon between the voltage across the supply contacts 212, 214 of the alternator 210 and the voltage across the pads 202, 204 of the regulator IC device 205 during such an ON mode of operation can exceed the required voltage regulation accuracy of +/−100 mV, and as such is required to be compensated for by the alternator regulator module 200 when regulating the voltage across the alternator 210 based on a measured voltage across the pads 202, 204 of the regulator IC device 205.

Figure 4:
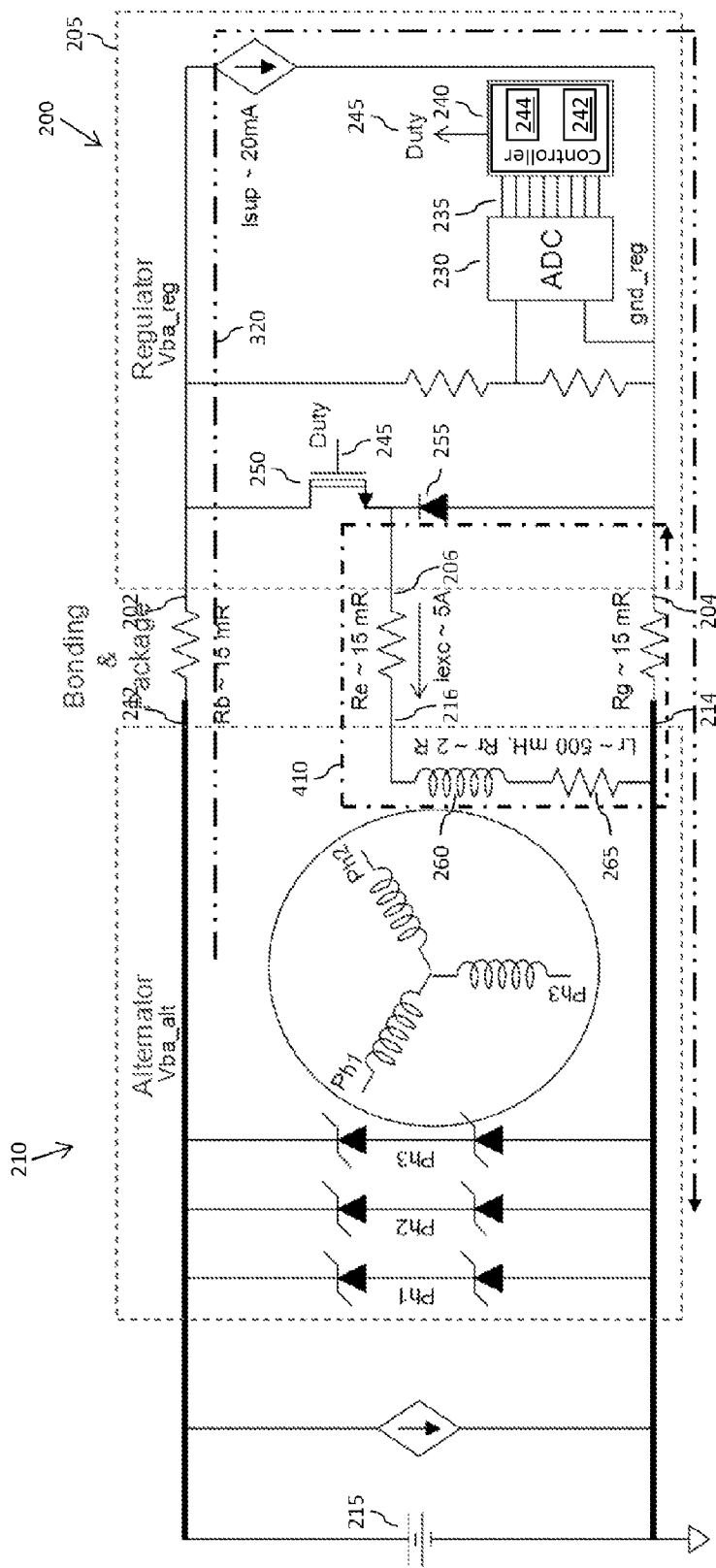

Referring now to FIG. 4, there is illustrated a simplified schematic diagram of the alternator regulator module 200 of FIG. 2 when operating in a second, OFF mode in which the control switch 250 is controlled by the control signal 245 to be in an OFF state. The excitation current Iexc in such an OFF mode of operation is indicated generally by a first broken arrow 410 in FIG. 4. The difference dVoff between the voltage across the supply contacts 212, 214 of the alternator 210 and the voltage across the pads 202, 204 of the regulator IC device 205 during such an OFF mode of operation may again be expressed in terms of the IR drops across the parasitic resistances Rb and Rg as:

$$dVoff = Rb^*Isup - Rg^*(Iexc - Isup) \quad \text{[Equation 4]}$$

$$= -Iexc^*Rg + Isup^*(Rb + Rg) \quad \text{[Equation 5]}$$

Assuming parasitic resistances of 15 mΩ, an excitation current 410 of 8 A and a typical supply current 320 of, say, 20 mA: dVoff=15 m*20 m−15 m*(8 A-20 mA)~−120 mV. From this it is apparent that the difference dVoff between the voltage across the supply contacts 212, 214 of the alternator 210 and the voltage across the pads 202, 204 of the regulator IC device 205 during such an OFF mode of operation can also exceed the required voltage regulation accuracy of +/−100 mV, and as such is also required to be compensated for by the alternator regulator module 200 when regulating the voltage across the alternator 210 based on a measured voltage across the pads 202, 204 of the regulator IC device 205.

The average difference dVavg between the voltage across the supply contacts 212, 214 of the alternator 210 and the voltage across the pads 202, 204 of the regulator IC device 205 may again be expressed as:

$$dVavg^*2 = dVon + dVoff \quad \text{[Equation 6]}$$

Substituting in Equations 3 and 5 into Equation 6 gives:

$$dVavg^*2 = Iexc^*(Rb-Rg) + 2^*Isup^*(Rb+Rg) \quad \text{[Equation 7]}$$

If the parasitic resistances Rb and Rg are balanced, Rb−Rg~0 and Equation 7 may be rewritten:

$$dVavg = Isup^*(Rb+Rg) \quad \text{[Equation 8]}$$

Assuming parasitic resistances of 15 mΩ, an excitation current 410 of 8 A and a typical supply current 320 of, say, 20 mA: dVavg~20 mA*30 mR~600 µV. This 600 µV is significantly less than the required voltage regulation accuracy of +/−100 mV, and thus is small enough to be neglected.

The inventors have recognised that due to the large capacitance provided by the vehicle battery 215, the voltage Vba_alt across the alternator will not change significantly during a period of a single PWM cycle of the control signal 245, which is typically around 5 ms in duration. Accordingly, the voltage Vba_alt across the supply contacts 212, 214 of the alternator 210 may be expressed as:

$$Vba\_alt = (Vba\_reg\_avg + dVavg) \quad \text{[Equation 9]}$$

where Vba_reg_avg is the average voltage across the pads 202, 204 of the regulator IC device 205 in one PWM cycle: (Vba_reg_on+Vba_reg_off)/2. Since the average difference dVavg between the voltage across the supply contacts 212, 214 of the alternator 210 and the voltage across the pads 202, 204 of the regulator IC device 205 is small enough to be neglected, Equation 9 may be simplified to:

$$Vba\_alt \sim Vba\_reg\_avg \quad \text{[Equation 10]}$$

Thus, the inventors have recognised that the average voltage Vba_reg_avg across the pads 202, 204 of the regulator IC device 205 in one PWM cycle may be measured and used to compensate for the IR drop across the parasitic resistances Rb and Rg when regulating the voltage Vba_alt across the contacts 212, 214 of the alternator 210, with voltage regulation accuracy of, in the above example, +/−600 µV; an order of more than 100× the voltage regulation accuracy of +/−100 mV required for the next generation of alternator regulators.

Accordingly, in some examples embodiments there is provided a method of regulating an output voltage of an alternator, such as may be implemented within the alternator regulator module 200 of FIGS. 2 to 4. The method comprises measuring a first voltage (Vba_reg_on) across a first external contact of the alternator regulator module (e.g. pad 202) operably coupled to a first output contact of the alternator (e.g. contact 212) and a second external contact of the alternator regulator module (e.g. pad 204) operably coupled to a second output contact of the alternator (e.g. contact 214) during an ON state of an excitation cycle for the alternator. Such an ON state may comprise, for example, an ON state of the PWM cycle controlled by way of the control signal 245 in the alternator regulator 200 of FIGS. 2 to 4. The method further comprises measuring a second voltage (Vba_reg_off) across the first external contact of the alternator regulator module and the second external contact of the alternator regulator module during an OFF state of an excitation cycle for the alternator, deriving an average voltage value (Vba_reg_avg) of the first and second voltage measurements, and deriving an offset value based at least partly on the derived average voltage value. The method still further comprises measuring an instantaneous voltage across the first external contact of the alternator regulator module and the second external contact of the alternator regulator module, and configuring a control signal (e.g. the control signal 245) for regulating the output voltage of the alternator based at least partly on the instantaneous voltage measurement and the derived offset value.

As described above, by deriving an offset value based on an average voltage value for the ON state and OFF state voltages across the alternator voltage regulator in an excitation (e.g. PWM) cycle, this offset may be used to compensate for the IR drop across the parasitic resistances between the alternator voltage regulator and the alternator when regulating the voltage Vba_alt across the contacts of the alternator, with voltage regulation accuracy of, in the above example, +/−600 µV; an order of more than 100× the voltage regulation accuracy of +/−100 mV required for the next generation of alternator regulators. Advantageously, such a method enables accurate voltage regulation of the alternator without the requiring the parasitic resistance values to be determined or estimated.

Accordingly, in the illustrated example of FIGS. 2 to 4, the digital control component 240 of the alternator regulator module 200 may be arranged to receive an indication of a first voltage (Vba_reg_on) across pads 202 and 204 during an ON state of an excitation cycle for the alternator 210. The digital control component 240 may be further arranged to receive an indication of a second voltage (Vba_reg_off) across pads 202 and 204 during an OFF state of an excitation cycle for the alternator 210, derive an average voltage value (Vba_reg_avg) of the first and second voltages, and derive an offset value based at least partly on the derived average voltage value.

The digital control component 240 of the alternator regulator module 200 may be further arranged to receive an indication of an instantaneous voltage across pads 202 and 204, and configure the control signal 245 for regulating the output voltage of the alternator 210 based at least partly on the instantaneous voltage and the derived offset value.

In the illustrated example, the digital control component 240 comprises a low pass filter component 242 (for example a moving average filter component) arranged to derive the average voltage value of the first and second voltages. The digital control component 240 in the illustrated example further comprises a control signal configuration component 244 arranged to derive the offset value based (at least partly) on the derived average voltage value, and configure the control signal 245 for regulating the output voltage of the alternator 210 based at least partly on the instantaneous voltage and the derived offset value.

In the illustrated example, the alternator regulator module 200 has been illustrated and described as comprising a digital control component 240, and an ADC component 230 arranged to detect (measure) the voltage across the pads 202, 204 of the regulator IC device 205, and to provide a digital signal 235 comprising an indication of the voltage across the pads 202, 204 to the digital control component 240. However, it is contemplated that the present invention is not limited to such a digital implementation, and that the control loop provided by the ADC component 230 and the digital control component 240 may alternatively be provided by way of analogue circuitry. For example, the alternator regulator module 200 may comprise, say, a potentiometer or other voltage measurement component arranged to measure the voltage across the pads 202, 204 of the regulator IC device 205, and to output an indication of the voltage across the pads 202, 204. The alternator regulator module 200 may further comprise an analogue low pass filter arranged to receive an indication of a first voltage (Vba_reg_on) across the pads 202 and 204 during an ON state of an excitation cycle for the alternator 210, receive an indication of a second voltage (Vba_reg_off) across pads 202 and 204 during an OFF state of an excitation cycle for the alternator 210, and derive an average voltage value (Vba_reg_avg) of the first and second voltages. For example, such an analogue low pass filter may comprise a moving average filter or the like. It will be appreciated by a person skilled in the art that by definition any type of low-pass filtering constitutes averaging.

Analogue control signal configuration circuitry may then be provided within the alternator regulator module 200 to derive an offset value based (at least partly) on the derived average voltage value, and configure the control signal 245 for regulating the output voltage of the alternator 210 based at least partly on an instantaneous voltage across the pads 202, 204 of the regulator IC device 205 and the derived offset value.

In the description above in relation to Equations 7 and 8, the parasitic resistances Rb and Rg have been assumed to be balanced, and thus that Rb−Rg~0. In practice, at high temperatures Rb−Rg may be in the region of 1 m$\Omega$, while each of the parasitic resistances at such high temperatures may be in the region of 10 m$\Omega$. Even with such non-balanced parasitic resistances with excitation currents of 8 A and supply currents of, say 20 mA, dVavg may be determined from Equation 7 as (8 A*1 m$\Omega$+2*20 mA*20 m$\Omega$)/2=4.4 mV which is still well within the required voltage regulation accuracy of +/−100 mV In practice, the voltage across the pads 202, 204 of the regulator IC device 205 may be sensed by the ADC component 230 through a low-pass filter (not shown) so the timing when to measure the voltage across the pads 202, 204 of the regulator IC device 205 in the ON and OFF states may need to take into consideration the time required by the signal output by the low-pass filter to settle at the input of the ADC component 230. During this time the current through the rotor of the alternator 210 changes, which changes the IR drops in the bond wires/package between the alternator 210 and the alternator regulator module 200. However, the current in the rotor of the alternator 210 flows through an inductance of hundreds of mH, and follows the basic V=L*dI/dt equation. During the excitation cycle, the voltage V is substantially constant and, and thus the current changes as dI=V/L*dt. With example values of 14V, 500 mH, 5 ms, for the whole duration of a 200 Hz (5 ms) excitation cycle, the excitation current only changes by a maximum of 14/0.5*0.005=0.14 A. With the example of 10 mOhm parasitic resistance, this leads to 1.4 mV modulation of voltage caused by the changing current through the rotor of the alternator 210 that is two orders of magnitude smaller than the required voltage regulation accuracy of +/−100 mV, and thus can safely be neglected.

Figures 5, 6:
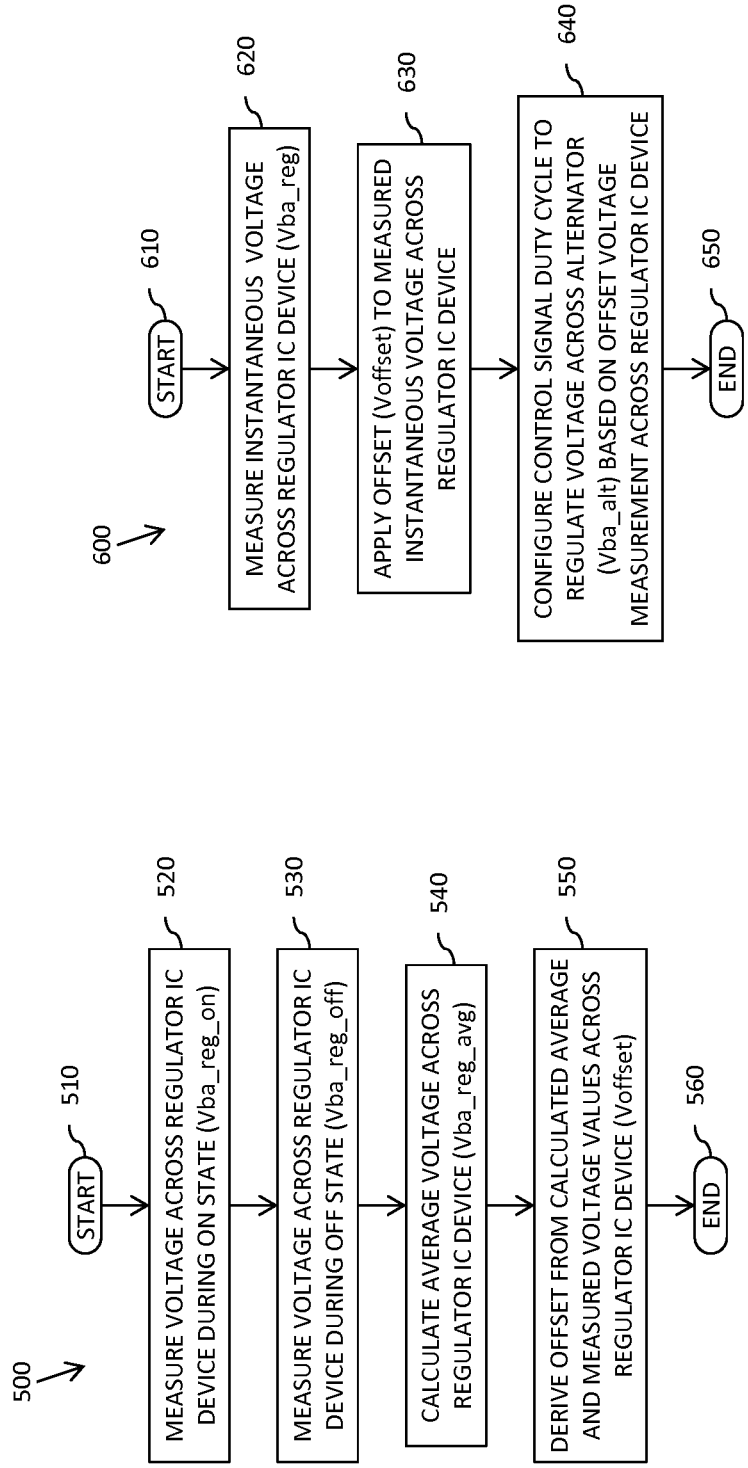
FIGS. 5 and 6 illustrate simplified flowcharts of an example of such a method of regulating an output voltage of an alternator.

Referring now to FIGS. 5 and 6, there are illustrated simplified flowcharts 500, 600 of an example of such a method of regulating an output voltage of an alternator, such as may be implemented within the alternator regulator module 200 of FIGS. 2 to 4.

Referring first to FIG. 5, there is illustrated a simplified flowchart 500 of first part of the method in which an offset value is derived. This part of the method starts at 510 and moves on to 520 where the method comprises measuring a first voltage (Vba_reg_on) across a first external contact of the alternator regulator module (e.g. pad 202) operably coupled to a first output contact of the alternator (e.g. contact 212) and a second external contact of the alternator regulator module (e.g. pad 204) operably coupled to a second output contact of the alternator (e.g. contact 214) during an ON state of an excitation cycle for the alternator. For example, the ADC component 230 of the alternator regulator module 200 may be arranged to receive an indication of the voltage across the pads 202, 204 of the regulator IC device 205 during an ON state of an excitation cycle for the alternator 210 in which the control switch 250 is arranged to couple the excitation pad 206 of the regulator IC device 205 to the positive supply pad 202 of the regulator IC device 205. The ADC component 230 may then output a digital signal 235 representative of the received indication of the voltage across the pads 202, 204 to the digital control component 240.

Next, at 530, the method comprises measuring a second voltage (Vba_reg_off) across the first and second external contacts of the alternator regulator module (e.g. pads 202 and 204) during an OFF state of an excitation cycle for the alternator. For example, the ADC component 230 of the alternator regulator module 200 may be arranged to receive an indication of the voltage across the pads 202, 204 of the regulator IC device 205 during an OFF state of an excitation cycle for the alternator 210 in which the control switch 250 is arranged to isolate the excitation pad 206 of the regulator IC device 205 from the positive supply pad 202 of the regulator IC device 205. The ADC component 230 may then output a digital signal 235 representative of the received indication of the voltage across the pads 202, 204 to the digital control component 240. In some examples, the second voltage is measured during an OFF state of the same excitation cycle as the ON state during which the first voltage (Vba_reg_on) is measured.

It will be appreciated that the measuring of the first and second voltages across the regulator IC device 205 during ON and OFF states respectively of an excitation cycle may be obtained in either order, and the invention is not limited to the order illustrated in FIG. 5. For example, the second voltage measured during an OFF state may be obtained ahead of the first voltage measured during an ON state. In some examples, the first and second voltage measurements are obtained during adjacent ON and OFF states (e.g. of the same or adjacent excitation cycle(s)) for the alternator in order to minimise any variation in the voltage across the alternator 210 when the two voltage measurements across the regulator IC device 205 are obtained.

Having obtained the first and second voltage measurements (Vba_reg_on, Vba_reg_off), the method moves on to 540 where an average voltage value (Vba_reg_avg) of the first and second voltage measurements is derived, for example by the first and second voltage measurements (Vba_reg_on, Vba_reg_off) and dividing by two. As described above and outlined in Equation 10, such an average voltage value may be considered as representative of the output voltage (Vba_alt) of the alternator 210. Accordingly, this average value may be used to derive an offset value with respect to the voltage measured across the regulator IC device 205, as performed at 550.

In some examples, the method may comprise deriving a single offset value based on a difference between the derived average voltage value (Vba_reg_avg) and one of the first voltage measurement (Vba_reg_on) and the second voltage measurement (Vba_reg_off). As determined above, the voltage difference dV is of substantially equal magnitude (but opposite sign) during ON and OFF states. Accordingly, and as described in greater detail below, such a single offset will comprise a magnitude suitable for compensating for the IR drop across the parasitic resistances during both ON states and OFF states. However, in some examples, the method may comprise deriving a first offset value based on a difference between the derived average voltage value and the first voltage measurement (Vba_reg_on), and deriving a second offset value based on a difference between the derived average voltage value and the second voltage measurement (Vba_reg_off). In this manner, the different first and second offset values may be used for compensating for the IR drop across the parasitic resistances during respective ON states and OFF states.

Having derived the (or each) offset value, this part of the method ends, at 560.

Referring now to FIG. 6, this part of the method starts at 610, and moves on to 620 where an instantaneous voltage (Vba_reg) across the first external contact of the alternator regulator module (e.g. pad 202) and the second external contact of the alternator regulator module (e.g. pad 204) is measured. For example, the ADC component 230 of the alternator regulator module 200 may be arranged to receive an indication of the instantaneous voltage across the pads 202, 204 of the regulator IC device 205 and output a digital signal 235 representative of the received indication of the instantaneous voltage across the pads 202, 204 to the digital control component 240. In the example illustrated in FIG. 6, the offset derived in the part of the method illustrated in FIG. 5 is then applied to the measured instantaneous voltage (Vba_reg) to compensate for the IR drop across the parasitic resistances between the alternator regulator module and the alternator, at 630, and a control signal for regulating the output voltage of the alternator is configured based on the offset instantaneous voltage measurement, at 640.

In some examples, the offset value may be negated (i.e. comprising the same magnitude but with opposing sign) when applied to the measured instantaneous voltage (Vba_reg), and in some examples a positive offset value may be applied to the measured instantaneous voltage (Vba_reg) when measured during a first (i.e. ON or OFF) state and a negative offset value may be applied to the measured instantaneous voltage (Vba_reg) when measured during a second (i.e. OFF or ON). For example, if the offset value is derived based on, say, subtracting the first voltage measurement (Vba_reg_on) from the average voltage value (Vba_reg_avg), this would typically result in a negative offset value being derived. Accordingly, when the measured instantaneous voltage (Vba_reg) is measured during an ON state of an excitation cycle for the alternator, this negative offset value may be negated (to produce a positive offset value) and the negated offset value applied to the measured instantaneous voltage (Vba_reg) to compensate for the lower visible voltage effect of the IR drop across the parasitic resistances. Conversely, when the measured instantaneous voltage (Vba_reg) is measured during an OFF state of an excitation cycle for the alternator, this negative offset value may be applied without being negated to the measured instantaneous voltage (Vba_reg) to compensate for the higher visible voltage effect of the IR drop across the parasitic resistances. Alternatively, if the offset value is derived based on, say, subtracting the second voltage measurement (Vba_reg_off) from the average voltage value (Vba_reg_avg), this would typically result in a positive offset value being derived. Accordingly, when the measured instantaneous voltage (Vba_reg) is measured during an ON state of an excitation cycle for the alternator, this positive offset value may be applied without being negated to the measured instantaneous voltage (Vba_reg) to compensate for the higher visible voltage effect of the IR drop across the parasitic resistances. Conversely, when the measured instantaneous voltage (Vba_reg) is measured during an OFF state of an excitation cycle for the alternator, this positive offset value may be negated (to produce a negative offset value) and the negated offset value applied to the measured instantaneous voltage (Vba_reg) to compensate for the lower visible voltage effect of the IR drop across the parasitic resistances.

In some examples, such as the example illustrated in FIGS. 2 to 4, the control signal for regulating the output voltage of the alternator may comprise a control signal for controlling an excitation current provided to the alternator. Furthermore, in some examples, such as the example illustrated in FIGS. 2 to 4, the control signal for regulating the output voltage of the alternator may comprise a pulse width modulated control signal.

In the illustrated examples, configuring the control signal for regulating the output voltage of the alternator based at least partly on the instantaneous voltage measurement and the derived offset value has been implemented by way of applying the derived offset value to the instantaneous voltage measurement and configuring the control signal for regulating the output voltage of the alternator based at least partly on offset the instantaneous voltage measurement. However, it is contemplated that the derived offset value may be used to compensate the control signal in any suitable manner. For example, in some examples the control signal may be configured based on, say, a comparison of the instantaneous voltage measurement to a reference voltage value. Accordingly, in some examples it is contemplated that the offset value may be applied to the reference voltage instead of the instantaneous voltage measurement.

Furthermore, in the illustrated examples the invention has been described with reference to an alternator regulator module 200 comprising a digital control component 240, whereby the method of the present invention may for the most part be implemented within the digital control component. However, it is contemplated that in some examples the present invention may equally be implemented by way of analogue components and circuitry.

As will be apparent to a person skilled in the art, the part of the example method illustrated in FIG. 6 may be performed substantially continuously whilst the output voltage of the alternator is required to be regulated. By contrast, it will be appreciated that the part of the example method illustrated in FIG. 5 for deriving the offset value need not be performed substantially continuously, and may be performed on a periodic basis (e.g. upon each expiration of a timer or the like), or upon certain events occurring, or simply upon initiation by some other component as required.

Parts of the invention, such as some or all of those parts implemented within the digital control component 240, may be implemented in a computer program for running on a computer system, at least including code portions for performing steps of a method according to the invention when run on a programmable apparatus, such as a computer system or enabling a programmable apparatus to perform functions of a device or system according to the invention.

A computer program is a list of instructions such as a particular application program and/or an operating system. The computer program may for instance include one or more of: a subroutine, a function, a procedure, an object method, an object implementation, an executable application, an applet, a servlet, a source code, an object code, a shared library/dynamic load library and/or other sequence of instructions designed for execution on a computer system.

The computer program may be stored internally on a tangible and non-transitory computer readable storage medium or transmitted to the computer system via a computer readable transmission medium. All or some of the computer program may be provided on computer readable media permanently, removably or remotely coupled to an information processing system. The tangible and non-transitory computer readable media may include, for example and without limitation, any number of the following: magnetic storage media including disk and tape storage media; optical storage media such as compact disk media (e.g., CD-ROM, CD-R, etc.) and digital video disk storage media; non-volatile memory storage media including semiconductor-based memory units such as FLASH memory, EEPROM, EPROM, ROM; ferromagnetic digital memories; MRAM; volatile storage media including registers, buffers or caches, main memory, RAM, etc.

A computer process typically includes an executing (running) program or portion of a program, current program values and state information, and the resources used by the operating system to manage the execution of the process. An operating system (OS) is the software that manages the sharing of the resources of a computer and provides programmers with an interface used to access those resources. An operating system processes system data and user input, and responds by allocating and managing tasks and internal system resources as a service to users and programs of the system.

The computer system may for instance include at least one processing unit, associated memory and a number of input/output (I/O) devices. When executing the computer program, the computer system processes information according to the computer program and produces resultant output information via I/O devices.

In the foregoing specification, the invention has been described with reference to specific examples of embodiments of the invention. It will, however, be evident that various modifications and changes may be made therein without departing from the scope of the invention as set forth in the appended claims and that the claims are not limited to the specific examples described above.

The connections as discussed herein may be any type of connection suitable to transfer signals from or to the respective nodes, units or devices, for example via intermediate devices. Accordingly, unless implied or stated otherwise, the connections may for example be direct connections or indirect connections. The connections may be illustrated or described in reference to being a single connection, a plurality of connections, unidirectional connections, or bidirectional connections. However, different embodiments may vary the implementation of the connections. For example, separate unidirectional connections may be used rather than bidirectional connections and vice versa. Also, plurality of connections may be replaced with a single connection that transfers multiple signals serially or in a time multiplexed manner. Likewise, single connections carrying multiple signals may be separated out into various different connections carrying subsets of these signals. Therefore, many options exist for transferring signals.

Although specific conductivity types or polarity of potentials have been described in the examples, it will be appreciated that conductivity types and polarities of potentials may be reversed.

Each signal described herein may be designed as positive or negative logic. In the case of a negative logic signal, the signal is active low where the logically true state corresponds to a logic level zero. In the case of a positive logic signal, the signal is active high where the logically true state corresponds to a logic level one. Note that any of the signals described herein can be designed as either negative or positive logic signals. Therefore, in alternate embodiments, those signals described as positive logic signals may be implemented as negative logic signals, and those signals described as negative logic signals may be implemented as positive logic signals.

Furthermore, the terms 'assert' or 'set' and 'negate' (or 'de-assert' or 'clear') are used herein when referring to the rendering of a signal, status bit, or similar apparatus into its logically true or logically false state, respectively. If the logically true state is a logic level one, the logically false state is a logic level zero. And if the logically true state is a logic level zero, the logically false state is a logic level one.

Those skilled in the art will recognize that the boundaries between logic blocks are merely illustrative and that alternative embodiments may merge logic blocks or circuit elements or impose an alternate decomposition of functionality upon various logic blocks or circuit elements. Thus, it is to be understood that the architectures depicted herein are merely exemplary, and that in fact many other architectures can be implemented which achieve the same functionality.

Any arrangement of components to achieve the same functionality is effectively 'associated' such that the desired functionality is achieved. Hence, any two components herein combined to achieve a particular functionality can be seen as 'associated with' each other such that the desired functionality is achieved, irrespective of architectures or intermediary components. Likewise, any two components so associated can also be viewed as being 'operably connected,' or 'operably coupled,' to each other to achieve the desired functionality.

Furthermore, those skilled in the art will recognize that boundaries between the above described operations merely illustrative. The multiple operations may be combined into a single operation, a single operation may be distributed in additional operations and operations may be executed at least partially overlapping in time. Moreover, alternative embodiments may include multiple instances of a particular operation, and the order of operations may be altered in various other embodiments.

Also for example, in one embodiment, the illustrated examples may be implemented as circuitry located on a single integrated circuit or within a same device. Alternatively, the examples may be implemented as any number of separate integrated circuits or separate devices interconnected with each other in a suitable manner.

Also for example, the examples, or portions thereof, may be implemented as soft or code representations of physical circuitry or of logical representations convertible into physical circuitry, such as in a hardware description language of any appropriate type.

Also, the invention is not limited to physical devices or units implemented in non-programmable hardware but can also be applied in programmable devices or units able to perform the desired device functions by operating in accordance with suitable program code, such as mainframes, minicomputers, servers, workstations, personal computers, notepads, personal digital assistants, electronic games, automotive and other embedded systems, cell phones and various other wireless devices, commonly denoted in this application as 'computer systems'.

However, other modifications, variations and alternatives are also possible. The specifications and drawings are, accordingly, to be regarded in an illustrative rather than in a restrictive sense.

In the claims, any reference signs placed between parentheses shall not be construed as limiting the claim. The word 'comprising' does not exclude the presence of other elements or steps then those listed in a claim. Furthermore, the terms 'a' or 'an,' as used herein, are defined as one or more than one. Also, the use of introductory phrases such as 'at least one' and 'one or more' in the claims should not be construed to imply that the introduction of another claim element by the indefinite articles 'a' or 'an' limits any particular claim containing such introduced claim element to inventions containing only one such element, even when the same claim includes the introductory phrases 'one or more' or 'at least one' and indefinite articles such as 'a' or 'an.' The same holds true for the use of definite articles. Unless stated otherwise, terms such as 'first' and 'second' are used to arbitrarily distinguish between the elements such terms describe. Thus, these terms are not necessarily intended to indicate temporal or other prioritization of such elements. The mere fact that certain measures are recited in mutually different claims does not indicate that a combination of these measures cannot be used to advantage.

The invention claimed is:

1. A method of regulating an output voltage of an alternator, the method comprising, within an alternator regulator module:
    measuring a first voltage across a first external contact of the alternator regulator module operably coupled to a first output contact of the alternator and a second external contact of the alternator regulator module operably coupled to a second output contact of the alternator during an ON state of an excitation cycle for the alternator;
    measuring a second voltage across the first external contact of the alternator regulator module and the second external contact of the alternator regulator module during an OFF state of an excitation cycle for the alternator;
    deriving an average voltage value of the first and second voltage measurements; and
    deriving an offset value based at least partly on the derived average voltage value,
    wherein the method further comprises:
        measuring an instantaneous voltage across the first external contact of the alternator regulator module and the second external contact of the alternator regulator module; and
        configuring a control signal for regulating the output voltage of the alternator based at least partly on the instantaneous voltage measurement and the derived offset value.

2. The method of claim 1, wherein the method comprises measuring the first voltage across the first and second external contacts of the alternator regulator module during an ON state of an excitation cycle for the alternator, and measuring the second voltage across the first and second external contacts of the alternator regulator module during an OFF state of an excitation cycle for the alternator adjacent the ON state during which the first voltage measurement is obtained.

3. The method of claim 1, wherein the method comprises applying the derived offset value to the instantaneous voltage measurement and configuring the control signal for regulating the output voltage of the alternator based at least partly on the offset instantaneous voltage measurement.

4. The method of claim 1, wherein the method comprises deriving the offset value based on a magnitude of a difference between the derived average voltage value and at least one of:
    the first voltage measurement across the first external contact of the alternator regulator module and the second external contact of the alternator regulator module; and
    the second voltage measurement across the first external contact of the alternator regulator module and the second external contact of the alternator regulator module.

5. The method of claim 1, wherein the method comprises:
    negating the derived offset value;
    configuring the control signal for regulating the output voltage of the alternator based at least partly on the instantaneous voltage measurement and the non-negated derived offset value when the instantaneous voltage is measured during one of an ON state and an OFF state of an excitation cycle for the alternator; and
    configuring the control signal for regulating the output voltage of the alternator based at least partly on the instantaneous voltage measurement and the negated derived offset value when the instantaneous voltage is measured during the other of an ON state and an OFF state of an excitation cycle for the alternator.

6. The method of claim 1, wherein the first output contact of the alternator comprises a positive output voltage contact of the alternator and the second output contact of the alternator comprises a ground contact of the alternator.

7. The method of claim 1, wherein the control signal for regulating the output voltage of the alternator comprises a control signal for controlling an excitation current provided to the alternator.

8. The method of claim 1, wherein the control signal for regulating the output voltage of the alternator comprises a pulse width modulated control signal.

9. An alternator regulator module for regulating an output voltage of an alternator, the alternator regulator module comprising at least one control component arranged to:
   receive an indication of a first voltage across a first external contact of the alternator regulator module operably coupled to a first output contact of the alternator and a second external contact of the alternator regulator module operably coupled to a second output contact of the alternator during an ON state of an excitation cycle for the alternator;
   receive an indication of a second voltage across the first external contact of the alternator regulator module and the second external contact of the alternator regulator module during an OFF state of an excitation cycle for the alternator;
   derive an average voltage value of the first and second voltages; and
   derive an offset value based at least partly on the derived average voltage value,
   wherein the at least one control component is further arranged to:
      receive an indication of an instantaneous voltage across the first external contact of the alternator regulator module and the second external contact of the alternator regulator module; and
      configure a control signal for regulating the output voltage of the alternator based at least partly on the instantaneous voltage and the derived offset value.

10. The alternator regulator module of claim 9, wherein the at least one control component is arranged to receive the indication of the first voltage across the first and second external contacts of the alternator regulator module during an ON state of an excitation cycle for the alternator, and receive the indication of the second voltage across the first and second external contacts of the alternator regulator module during an OFF state of an excitation cycle for the alternator adjacent the ON state during which the indication of the first voltage is obtained.

11. The alternator regulator module of claim 9, wherein the at least one control component is arranged to apply the derived offset value to the received indication of the instantaneous voltage across the first and second external contacts of the alternator regulator module and configure the control signal for regulating the output voltage of the alternator based at least partly on the offset instantaneous voltage indication.

12. The alternator regulator module of claim 9, wherein the at least one control component is arranged to derive the offset value based on a magnitude of a difference between the derived average voltage value and at least one of:
   the indication of the first voltage across the first external contact of the alternator regulator module and the second external contact of the alternator regulator module; and
   the indication of the second voltage across the first external contact of the alternator regulator module and the second external contact of the alternator regulator module.

13. The alternator regulator module of claim 9, wherein the at least one control component is arranged to:
   negate the derived offset value;
   configure the control signal for regulating the output voltage of the alternator based at least partly on the received indication of the instantaneous voltage across the first and second external contacts of the alternator regulator module and the non-negated derived offset value when the instantaneous voltage indication corresponds to one of an ON state and an OFF state of an excitation cycle for the alternator; and
   configure the control signal for regulating the output voltage of the alternator based at least partly on the received indication of the instantaneous voltage across the first and second external contacts of the alternator regulator module and the negated derived offset value when the instantaneous voltage indication corresponds to the other of an ON state and an OFF state of an excitation cycle for the alternator.

14. The alternator regulator module of claim 9, wherein the first output contact of the alternator comprises a positive output voltage contact of the alternator and the second output contact of the alternator comprises a ground contact of the alternator.

15. The alternator regulator module of claim 9, wherein the control signal for regulating the output voltage of the alternator comprises a control signal for controlling an excitation current provided to the alternator.

16. The alternator regulator module of claim 9, wherein the control signal for regulating the output voltage of the alternator comprises a pulse width modulated control signal.

17. The alternator regulator module of claim 9, wherein the alternator regulator module further comprises at least one analogue to digital converter component arranged to receive an analogue voltage signal representative of a voltage across the first and second external contacts of the alternator regulator and to output a digital signal comprising an indication of the voltage across the first and second external contacts of the alternator regulator; and
   the at least one control component comprises a digital control component arranged to receive the digital signal output by the at least one analogue to digital converter component.

18. The alternator regulator module of claim 9, wherein the at least one control component comprises a low pass filter component arranged to derive the average voltage value of the first and second voltages.

19. The alternator regulator module of claim 9, wherein the at least one control component comprises a control signal configuration component arranged to derive the offset value based at least partly on the derived average voltage value, and configure the control signal for regulating the output voltage of the alternator based at least partly on the instantaneous voltage and the derived offset value.

20. The alternator regulator module of claim 9 implemented within an integrated circuit device comprising at least one die within a single integrated circuit package.

* * * * *